US007954054B2

(12) United States Patent
Iwema et al.

(10) Patent No.: US 7,954,054 B2
(45) Date of Patent: *May 31, 2011

(54) INSERTION POINT BUNGEE SPACE TOOL

(75) Inventors: Marieke Iwema, Renton, WA (US); Leroy B. Keely, Portola Valley, CA (US); Susanne Alysia Clark Cazzanti, Bellevue, WA (US); F. David Jones, Redmond, WA (US); Charlton E. Lui, Redmond, WA (US); Rob Jarrett, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 957 days.

This patent is subject to a terminal disclaimer.

(21) Appl. No.: 11/119,814

(22) Filed: May 3, 2005

(65) Prior Publication Data

US 2005/0193321 A1    Sep. 1, 2005

Related U.S. Application Data

(63) Continuation of application No. 09/813,354, filed on Mar. 21, 2001, now Pat. No. 6,941,507.

(60) Provisional application No. 60/247,842, filed on Nov. 10, 2000.

(51) Int. Cl.
*G06F 17/24* (2006.01)
*G06F 3/033* (2006.01)

(52) U.S. Cl. ........ 715/256; 715/244; 715/268; 715/863; 345/156; 345/179

(58) Field of Classification Search .................. 715/243, 715/246, 255, 256, 268, 272, 764, 765, 863, 715/856–862, 769, 770, 244; 345/179
See application file for complete search history.

(56) References Cited

U.S. PATENT DOCUMENTS 4,475,239 A * 10/1984 van Raamsdonk ........... 382/309
4,686,649 A    8/1987 Rush et al.
(Continued)

OTHER PUBLICATIONS

Aha! InkWriterθ The simplicity of pen and paper, the power of word processing., Advertisement, 1983, 2 pp., aha! software corporation, Mountain View, CA.

(Continued)

*Primary Examiner* — Adam L Basehoar
(74) *Attorney, Agent, or Firm* — Shook, Hardy & Bacon L.L.P.

(57) ABSTRACT

A computer system and method for providing user feedback when creating, modifying, or editing electronic documents. An insertion point icon is placed in a document at a position for insertion and/or deletion of text, graphics, data, etc. Upon receiving a user input indicating movement, the insertion point icon is divided into two icons, one stationary at the position, and one moving with user input. When movement is complete, space contained between the icons may be deleted or inserted. The system may be used to shift handwritten text to subsequent lines on an electronic document containing handwritten text, and may be used to bring two groups of text together, deleting space in between. A connection line may be displayed between the icons to provide feedback regarding the action to be taken.

18 Claims, 13 Drawing Sheets

U.S. PATENT DOCUMENTS

| | | | |
|---|---|---|---|
| 4,709,348 A | | 11/1987 | Horn et al. |
| 5,220,649 A | | 6/1993 | Forcier |
| 5,231,698 A | | 7/1993 | Forcier |
| 5,428,805 A | | 6/1995 | Morgan |
| 5,438,662 A | * | 8/1995 | Randall ............... 715/776 |
| 5,502,803 A | | 3/1996 | Yoshida et al. |
| 5,517,578 A | | 5/1996 | Altman et al. |
| 5,553,217 A | | 9/1996 | Hart et al. |
| 5,590,257 A | | 12/1996 | Forcier |
| 5,613,019 A | | 3/1997 | Altman et al. |
| 5,623,679 A | | 4/1997 | Rivette et al. |
| 5,630,080 A | * | 5/1997 | Malamud et al. ............ 715/769 |
| 5,666,139 A | | 9/1997 | Thielens et al. |
| 5,666,552 A | * | 9/1997 | Greyson et al. ............... 715/210 |
| 5,778,404 A | | 7/1998 | Capps et al. |
| 5,838,321 A | | 11/1998 | Wolf |
| 5,867,144 A | * | 2/1999 | Wyard ............... 715/769 |
| 5,940,078 A | * | 8/1999 | Nagarajayya et al. ........ 715/859 |
| 5,953,735 A | | 9/1999 | Forcier |
| 5,956,423 A | | 9/1999 | Frink et al. |
| 6,011,553 A | * | 1/2000 | Komiyama ............... 715/839 |
| 6,105,044 A | | 8/2000 | DeRose et al. |
| 6,128,633 A | | 10/2000 | Michelman et al. |
| 6,163,784 A | | 12/2000 | Taguchi |
| 6,298,358 B1 | * | 10/2001 | Gormish ............... 715/236 |
| 6,326,970 B1 | | 12/2001 | Mott et al. |
| 6,340,967 B1 | | 1/2002 | Maxted |
| 6,408,092 B1 | | 6/2002 | Sites |
| 6,437,807 B1 | | 8/2002 | Berquist et al. |
| 6,473,102 B1 | | 10/2002 | Rodden et al. |
| 6,496,209 B2 | * | 12/2002 | Horii ............... 715/853 |
| 6,525,749 B1 | | 2/2003 | Moran et al. |
| 6,683,631 B2 | | 1/2004 | Carroll |
| 6,694,485 B1 | | 2/2004 | Kelley et al. |
| 6,752,317 B2 | | 6/2004 | Dymetman et al. |
| 6,820,237 B1 | | 11/2004 | Abu-Hakima et al. |
| 6,829,372 B2 | | 12/2004 | Fujioka |
| 6,938,220 B1 | * | 8/2005 | Shigematsu et al. .......... 715/863 |
| 7,134,095 B1 | * | 11/2006 | Smith et al. ............... 715/860 |
| 7,735,007 B2 | * | 6/2010 | Altman et al. ............... 715/244 |
| 2002/0069296 A1 | | 6/2002 | Aua et al. |
| 2002/0097270 A1 | * | 7/2002 | Keely et al. ............... 345/764 |
| 2002/0152240 A1 | | 10/2002 | Kitainik et al. |
| 2003/0001899 A1 | | 1/2003 | Partanen et al. |
| 2003/0023631 A1 | | 1/2003 | Castle |
| 2003/0212958 A1 | | 11/2003 | Altman et al. |
| 2003/0226113 A1 | | 12/2003 | Altman et al. |
| 2004/0032415 A1 | | 2/2004 | Rimas et al. |
| 2005/0005246 A1 | | 1/2005 | Card et al. |
| 2006/0031764 A1 | * | 2/2006 | Keyser et al. ............... 715/525 |

OTHER PUBLICATIONS

Aha! InkWriterθ for Magic Cap "The fastest, most convenient way to create faxes, notes and messages." Advertisement, 1993, 1994, 2 pp., aha! software corporation, Mountain View, CA.

Aha! 2.0 for Windows InkWriterθ The power of word processing, the convenience of pen and paper, Advertisement, 1994, 1995, 2 pp., aha! software corporation, Mountain View, CA.

Aha! software products, Web Page List of Products, Sep. 24, 1997, pp. 1-5, aha! software corporation, Mountain View, CA.

Fulton, Jennifer, "10 Minute Guide to Excel 97", Que Publishing, Dec. 1996.

Blostein, D. et al. "Justification of Printed Music", Communications of the ACM, vol. 34, No. 3, Mar. 1991, pp. 88-99.

Gitchell, David, et al., "Sim: A Utility for Detecting Similarity in Computer Programs", ACM SIGCSE Bulletin, vol. 31, Issue 1, Mar. 1999, pp. 266-270.

Anderson, Corin R., et al., "Personalizing Web Sites for Mobile Users", Proceedings of the Tenth International Conference on World Wide Web, Apr. 2001, pp. 565-575.

Das, Sumi, TechTV Vault, downloaded from http://www.g4tv.com/techtvvaulUfeatures/15435/DPWeb_DX_Palm_Browser.html, Apr. 7, 2000, pp. 1-3.

Wunsche, B. et al., A Scientific Visualization Schema Incorporating Perceptual Concepts, 2001, pp. 1-6.

Weinreich, H., et al., The Look of the Link-Concepts for the User Interface of Extended Hyperlinks, 2001, pp. 1-10.

Furuta, Richard, et al., "Document Formatting Systems: Survey, Concepts, and Issues", ACM Computing Surveys (CSUR), vol. 14, Issue 3, Sep. 1982, pp. 417-472.

Chen, Pehong, et al., "Incremental Document Formatting", Proceedings of the First ACM International Conference on Multimedia, Sep. 1993, pp. 93-100.

Bjork et al., "West: A Web Browser for Small Terminals," Proc. of the 12th Annual ACM Symposium on User Interface Software and Technology, Nov. 1999, pp. 187-196.

Moran et al., Pen-based Interaction Techniques for Organizing Material on an Electronic Whiteboard, UIST 97, copyright 1997 ACM, pp. 45-54.

Wilcox et al., Dynomite A Dynamically Organized Ink and Audio Notebook, CHI 97 Eelectronic Publication, copyright ACM 1997, pp. 1-15.

Gourley, John S., "A Language for Music Printing," Communications of the ACM, vol. 29, Issue 5, May 1986, pp. 388-401.

* cited by examiner

INSERTION POINT BUNGEE SPACE TOOL

CROSS REFERENCE TO RELATED APPLICATIONS

This application is a continuation of prior U.S. patent application Ser. No. 09/813,354, filed Mar. 21, 2001, which application claims priority to U.S. Provisional Patent Application Ser. No. 60/247,842, entitled Insertion Point Bungee Space Tool, filed Nov. 10, 2000, which applications are hereby incorporated by reference.

TECHNICAL FIELD

Aspects of the present invention relate generally to user interfaces for computer systems. More particularly, the present invention relates to providing computer users with improved visual feedback when editing textual documents on a computer. Further aspects relate to providing users with improved visual feedback when editing handwritten documents on a computer system.

BACKGROUND OF THE INVENTION

The use of computers and/or computing systems to generate textual documents has become an established practice in today's Computer Age. Through the use of a computer, such as a personal computer, and a keyboard (e.g., one having the "QWERTY" key configuration), it is now possible for users to type and create documents of many different types and formats.

Various word-processing programs also provide a certain amount of visual feedback, through a user interface, to provide the user with visual cues as to the effects of the user's actions. For example, in generating an electronic document using the "MICROSOFT® WORD" program, which is a word-processing product offered by Microsoft Corp., many visual cues are provided. One such visual cue is a flashing cursor that appears at a point in the document. The flashing cursor, represented by a vertical line, is the point at which text will appear if the user were to begin typing on the keyboard. In this regard, the location of the cursor may be referred to as the insertion point. The cursor is also the point from which text may be deleted upon pressing an "Insert" or "Delete" key on the keyboard, and may also serve as a first point in highlighting a portion of the document.

However, the use of such a cursor for various editing actions requires the user to study and learn multiple functions and commands, thus complicating the user's interaction with the system. To illustrate, FIG. 3A shows a screen of text from a prior art word processing program. In the FIG. 3A screen, several lines of text 301 may have been generated by the user, for example, by typing the letters on a keyboard. If the user should desire to insert additional space, or text, at a point 302 within the lines of text 301, the user generally is required to position the cursor 303 at the insertion point, and then add spaces or text (by hitting the space bar or keys on a keyboard) to perform the insertion. Carriage returns may also be inserted by pressing the "Enter" or "Return" key on a conventional keyboard. However, with each press of a key (e.g., spacebar), the entire portion of the lines of text 301 beyond the cursor 303 shifts as a result of the addition. If the user wishes to insert 20 spaces, the text might shift 20 times for the spaces. This shifting is disorienting to the user, and complicates the user's interaction with the displayed document. A similar problem is encountered if the user wishes to "close up" space between two groups of text. To illustrate, FIG. 3B shows another screen of text from a typical word processing program, in which two groups of text 304a, 304b are separated by space 305. If the user wishes to "close up" this space 305 by bringing the two groups of text together, the user typically must either: 1) highlight and delete the spaces and/or carriage returns between the groups of text; or 2) position the cursor at some point within the space 305, and begin pressing "Delete" or "Backspace" keys to delete the various components of space 305 (which may include spaces, tabs, carriage returns, etc.). These operations, however, also complicate the user's computer experience. In option 1, the user must learn how to properly select the entire space area 305, and then learn how to delete or cut the selected space area 305 from the document. An inadvertent selection of more, or less, than space 305 might result in an accidental deletion of some or all of the groups of text 304a, 304b, requiring the user to backtrack and attempt the deletion again. Option 2 involves the deletion of individual spaces, tabs, carriage returns, etc., one at a time. This one-at-a-time deletion may be disorienting to the user as text group 304b may be shifted once for each deletion. On slower machines, the repeated deletions may be affected faster than they are displayed, resulting in over deletions. On faster machines, the rate at which pages scroll is faster than the user's ability to respond, further frustrating the user.

FIGS. 3C-F illustrate another prior art attempt at easing the user's interaction with the displayed document. In the Microsoft® Inkwriter® product, a user could generate multiple lines 330 of text, which could be handwritten using a stylus, and interact with the displayed document using a pointing device (such as the stylus, mouse, etc.). The user could also place a cursor 332 at an insertion point. The cursor 332 would initially have the appearance of an "I-beam," as shown in FIG. 3C. As the user moved a pointer, such as a mouse or stylus pointer 334, over the cursor 332, also known as "hovering" over the cursor 332, a new hover symbol 336 would appear below the cursor 332, as shown in FIG. 3D. If the user were to subsequently "click and drag" the mouse cursor by, for example, pressing a mouse button and moving the mouse, the hover symbol 336 would be replaced by an expanding arrow 338. This "click and drag" may also be performed using a stylus. As the user "dragged" the cursor 332, the expanding arrow 338 would then dynamically indicate the vertical position of the mouse pointer 334, as shown in FIG. 3E, while maintaining the same horizontal position. Upon completing the drag, the text following the cursor 332 is moved to begin as a new line at the final vertical position of the mouse pointer 334.

The Inkwriter® hover symbol 336 and expanding arrow 338 provide some feedback to the user, but this feedback is limited. For example, no additional feedback is provided if the user drags the cursor 332 within the same line (e.g., to the left or right). Additionally, the amount of vertical feedback is limited to a vertical indication only. In the FIG. 3E screen, the expanding arrow 338 does not indicate the horizontal positioning of the pointer 334, resulting in some confusion on the part of the user as to what will happen when the dragging ceases. The operation of the Inkwriter® cursor is also confusing when the user wishes to delete space in a document. In deleting space or text, the Inkwriter® cursor 332 behaves as described above with respect to FIGS. 3C-E, resulting in a feedback display as shown in FIG. 3G. In the FIG. 3G screen, the expanding arrow 338 similarly provides limited feedback regarding exactly what text, if any, will be deleted when the dragging is completed.

The user's computer experience is complicated by these forms of editing feedback, which is undesirable from a computer-usability standpoint. Consequently, there is a need for a more intuitive and user-friendly form of feedback when editing documents with a computer. This need is further heightened in any computer system that attempts to simplify a user's computer experience.

SUMMARY OF THE INVENTION

The present invention relates to an editing tool for editing electronically displayed information. The tool permits a user to selectively expand and contract selected areas on a displayed document. The tool provides visual feedback to the user to permit the user to more readily appreciate how the document will be modified. The tool may be displayed to the user as an insertion point cursor with selectable handles. In some embodiments, the insertion point graphical cursor may be replaced with two cursors: one stationary and one mobile, in which the mobile cursor may be positioned in response to user inputs. The cursors may also have directional identifiers. An expanding line, or bungee line, may appear between two cursors on an electronic document to identify the portion of the document that lies between the cursors. The tool may be used in a variety of environments including computing systems employing a mouse or stylus as an input device.

These and other aspects and embodiments will be apparent in view of the following figures and detailed description.

DETAILED DESCRIPTION OF EMBODIMENTS OF THE INVENTION

Figure 1:
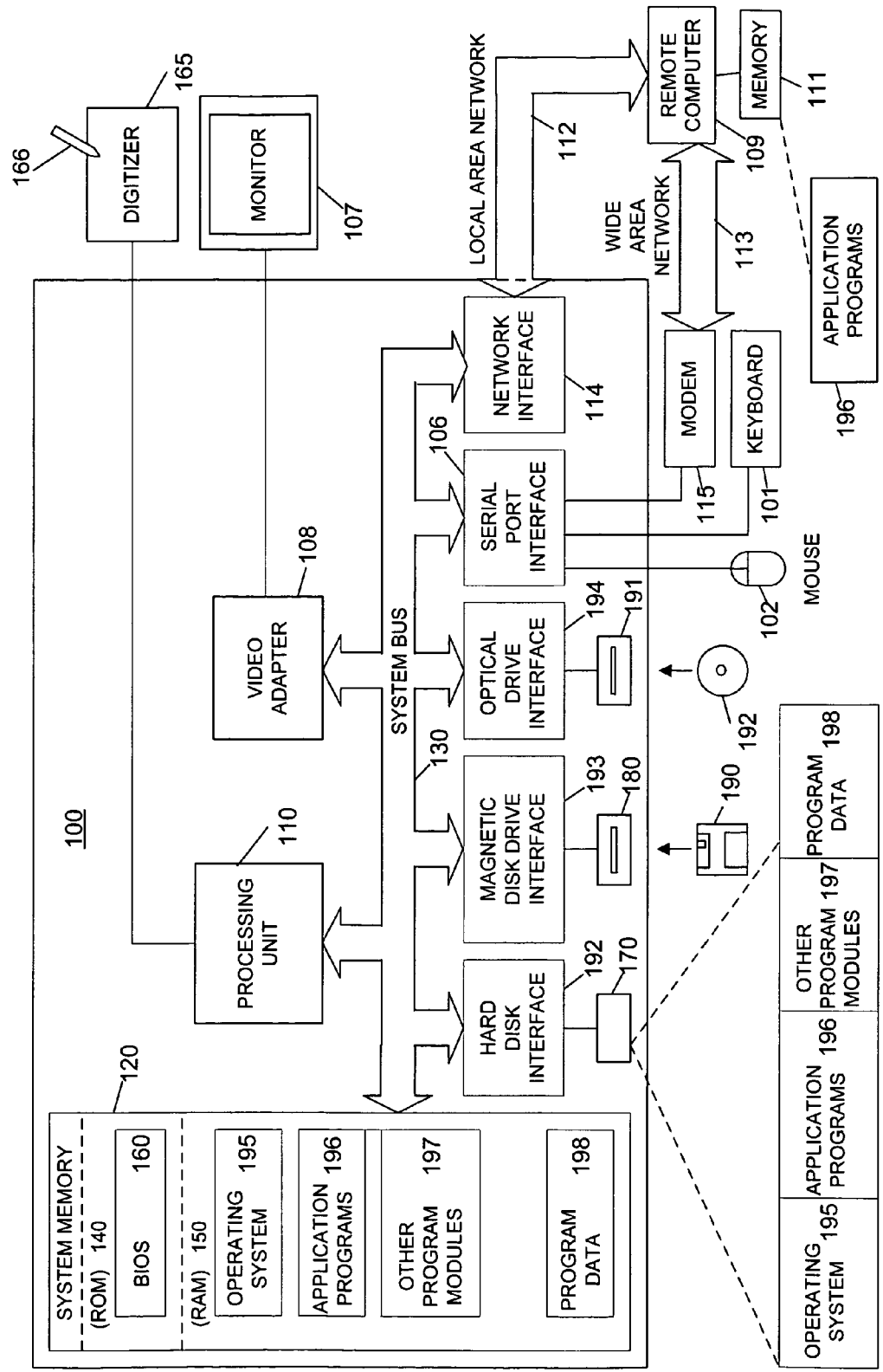
FIG. 1 shows a computing environment in which one or more aspects of the present invention may be implemented.

The present invention may be more readily described with reference to FIGS. 1-2 and 4-7. FIG. 1 illustrates a schematic diagram of a conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In a preferred embodiment, a pen digitizer 165 and accompanying pen or stylus 166 are provided in order to digitally capture freehand input. Although a direct connection between the pen digitizer 165 and the processing unit 110 is shown, in practice, the pen digitizer 165 may be coupled to the processing unit 110 via a serial port, parallel port or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are exemplary and other techniques for establishing a communications link between the computers can be used.

The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Although the FIG. 1 environment shows an exemplary environment, it will be understood that other computing environments may also be used. For example, one or more embodiments of the present invention may use an environment having fewer than all of the various aspects shown in FIG. 1 and described above, and these aspects may appear in various combinations and sub-combinations that will be apparent to one of ordinary skill.

Figure 2:
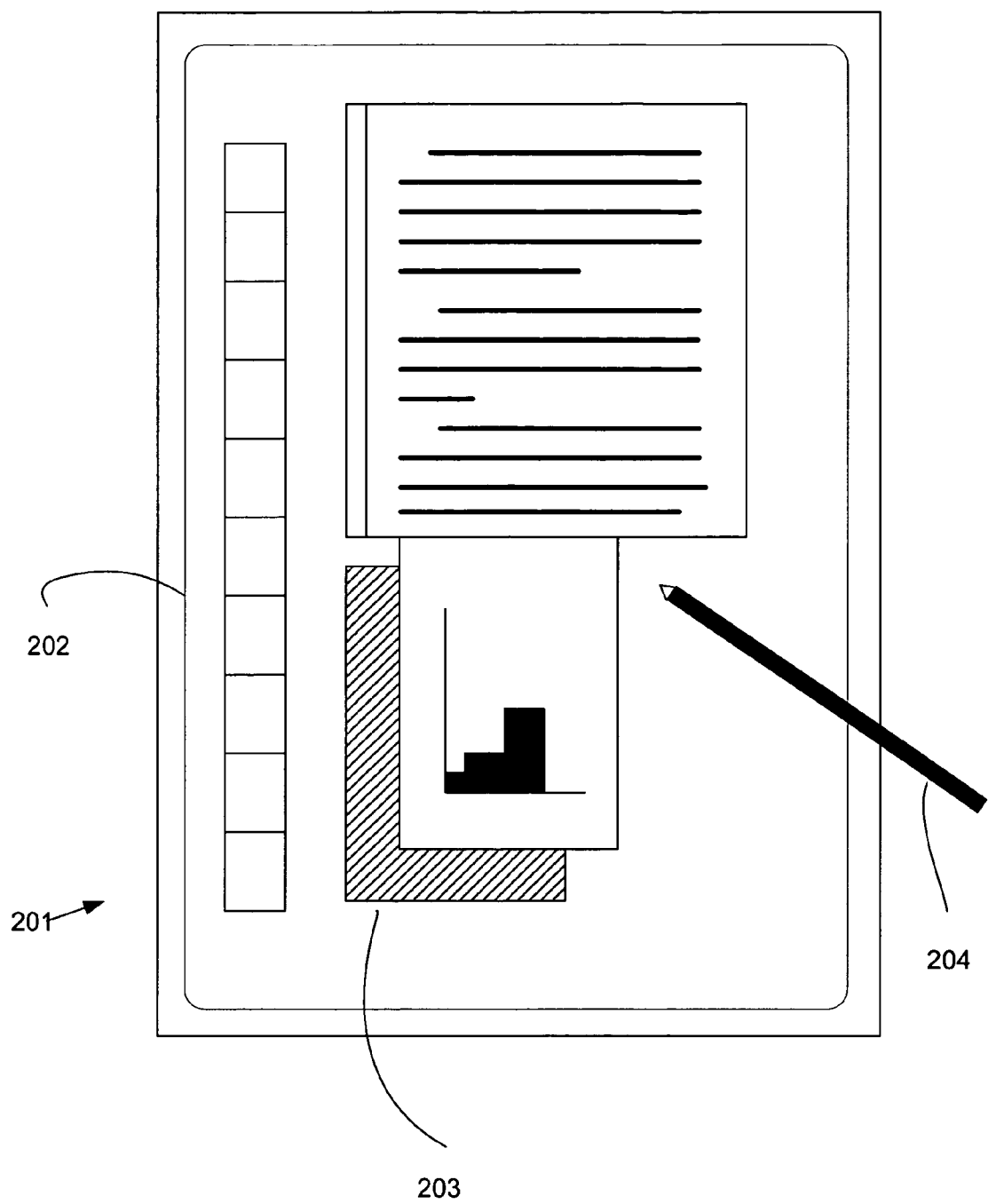
FIG. 2 shows a tablet computer configuration on which one or more embodiments of the present invention may be implemented.
Figure 3A:
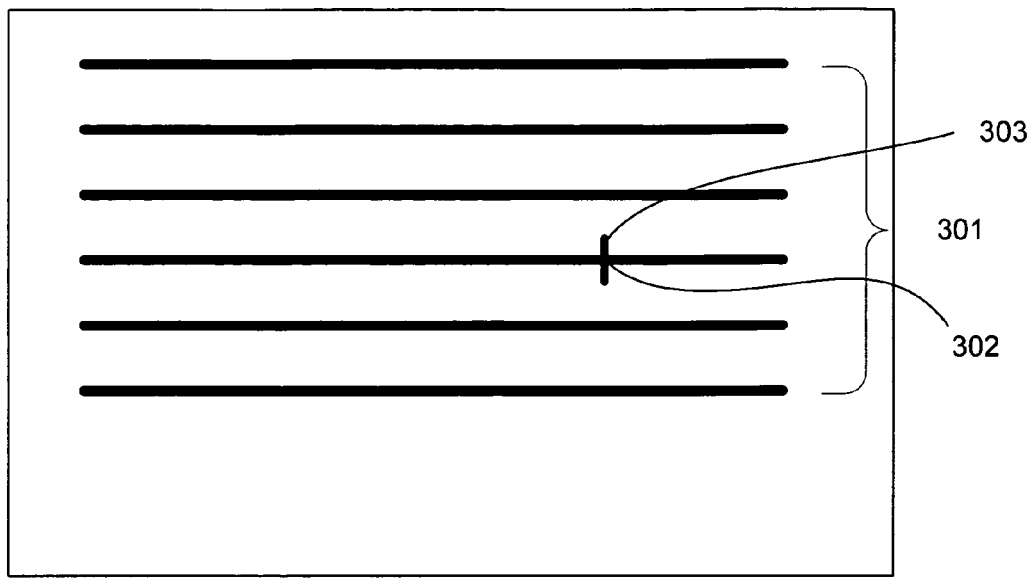
FIGS. 3A-G depict prior art screens of text using prior art word processors.
Figure 3B:
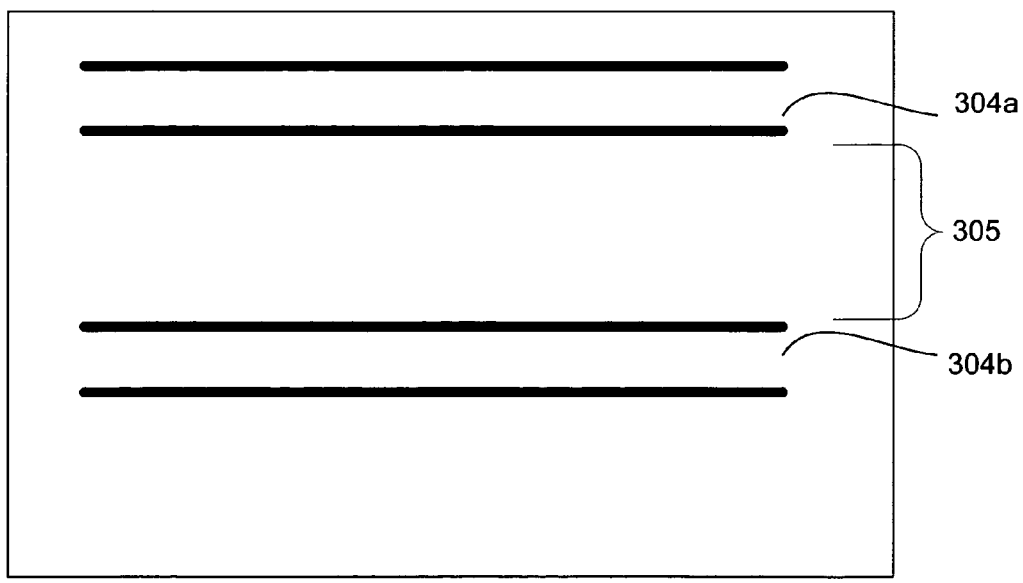
Figure 3C:
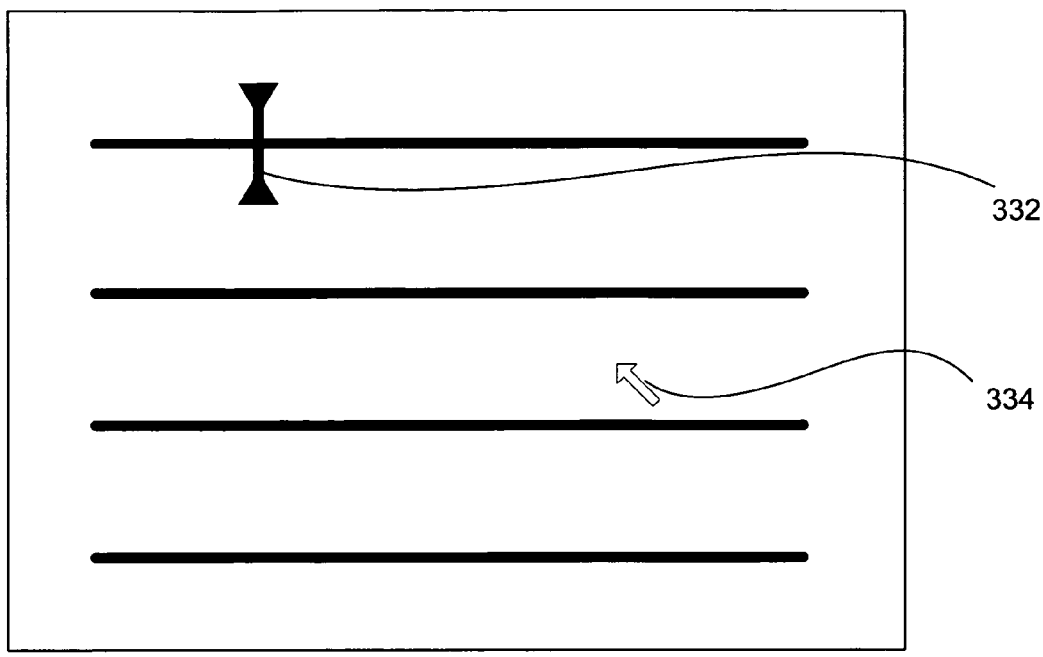
Figure 3D:
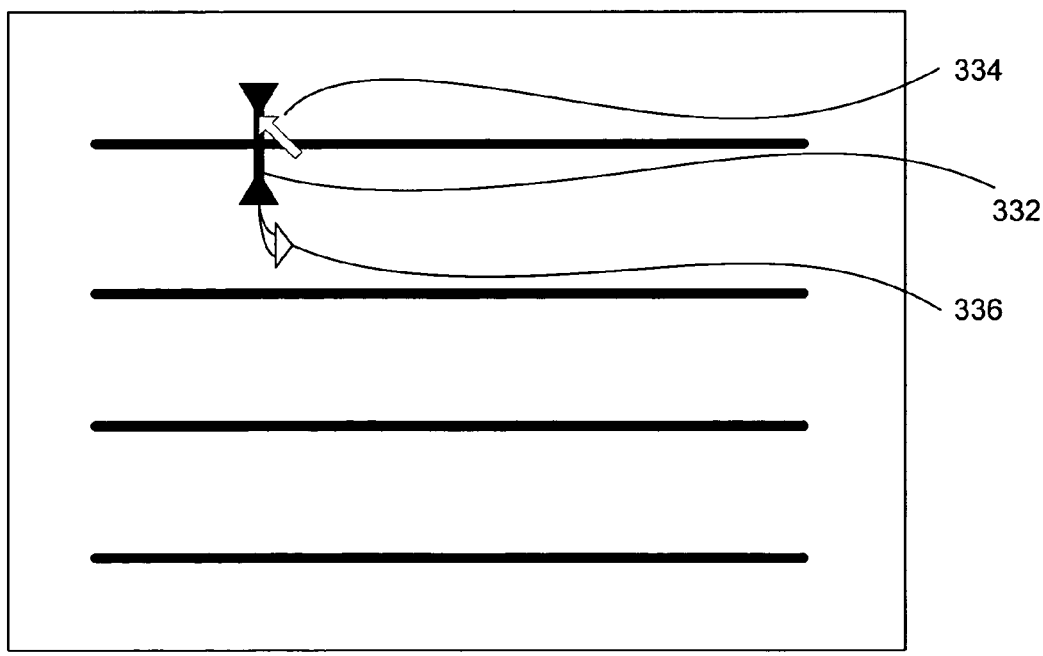
Figure 3E:
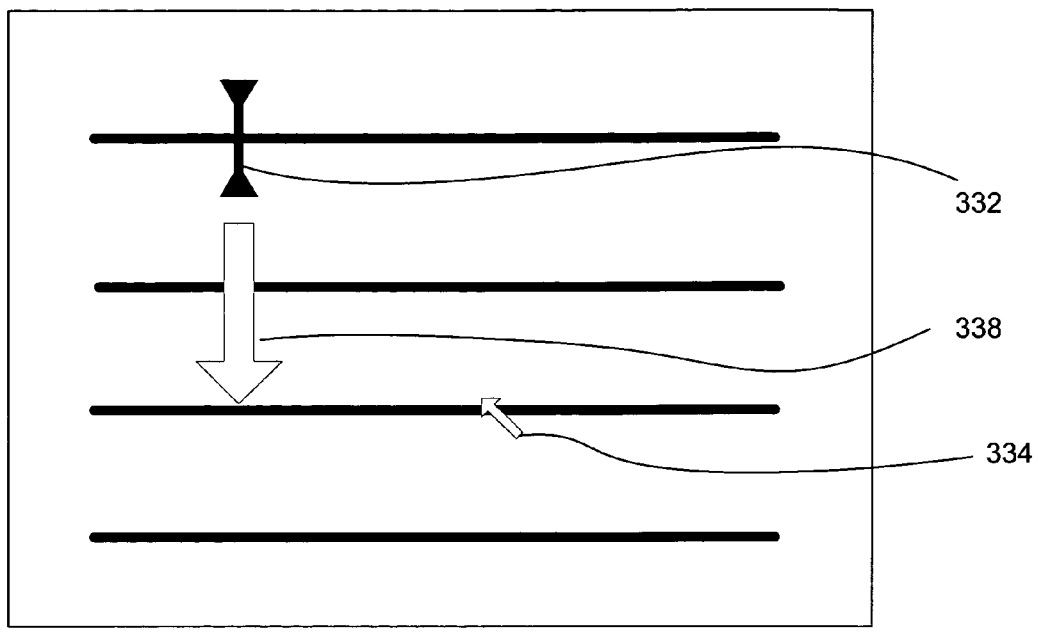
Figure 3F:
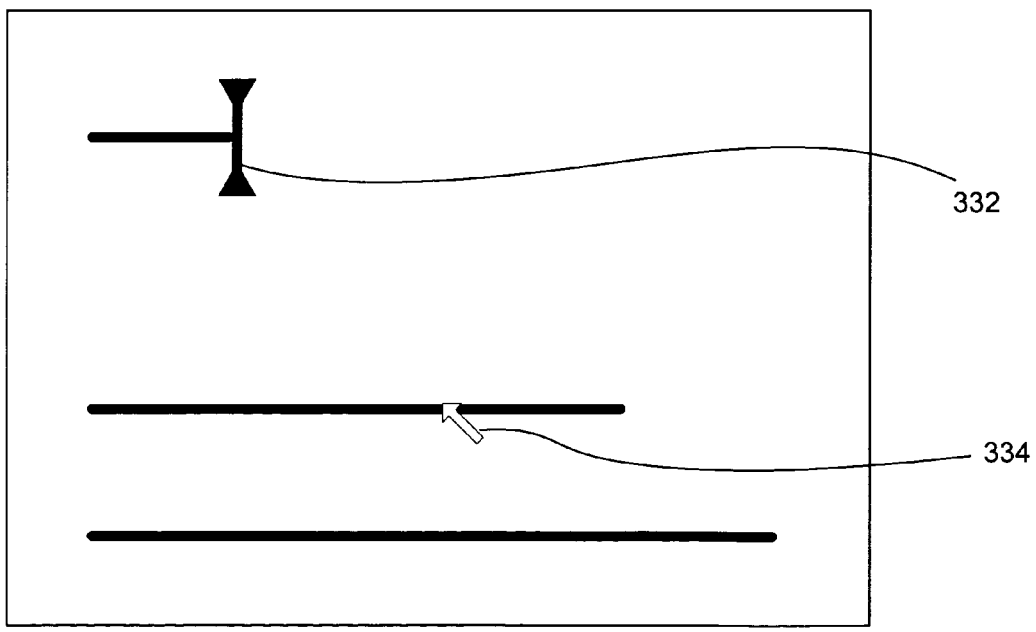
Figure 3G:
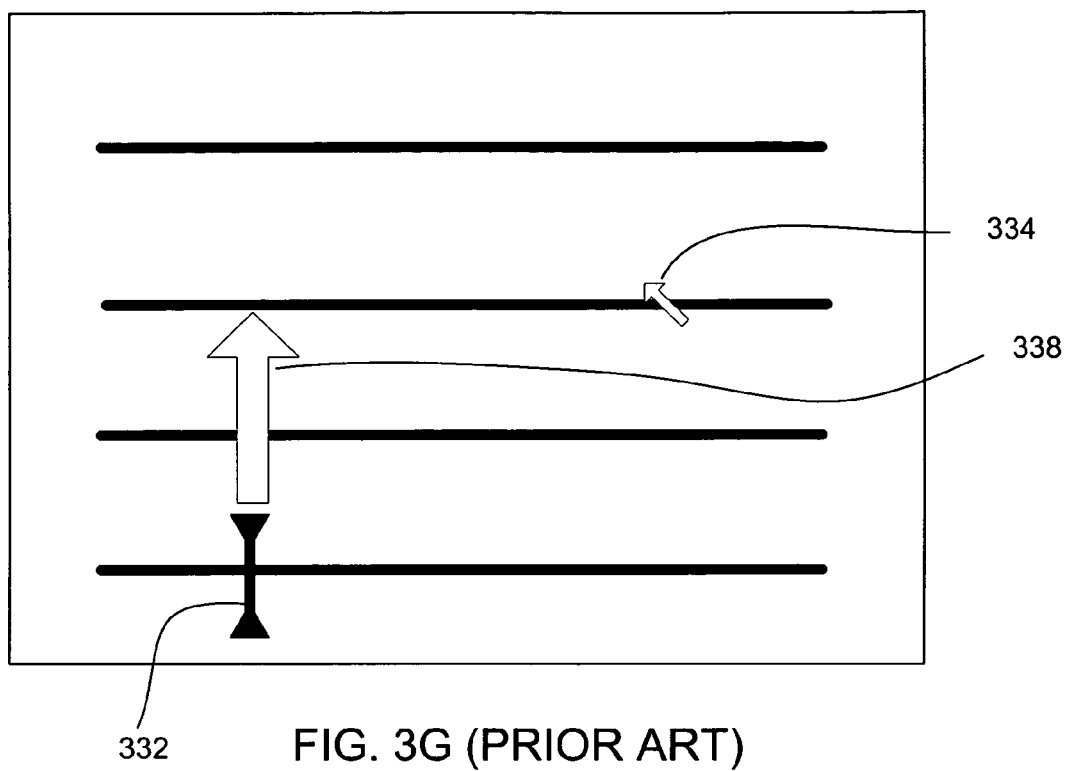

FIG. 2 illustrates a tablet PC 201 that can be used in accordance with various aspects of the present invention. Any or all of the features, subsystems, and functions in the system of FIG. 1 can be included in the computer of FIG. 2. Tablet PC 201 includes a large display surface 202, e.g., a digitizing flat panel display, preferably, a liquid crystal display (LCD) screen, on which a plurality of windows 203 is displayed. Using stylus 204, a user can select, highlight, and write on the digitizing display area. Examples of suitable digitizing display panels include electromagnetic pen digitizers, such as the Mutoh or Wacom pen digitizers. Other types of pen digitizers, e.g., optical digitizers, may also be used. Tablet PC 201 interprets marks made using stylus 204 in order to manipulate data, enter text, and execute conventional computer application tasks such as spreadsheets, word processing programs, and the like.

A stylus could be equipped with buttons or other features to augment its selection capabilities. In one embodiment, a stylus could be implemented as a simple rigid (or semi-rigid) stylus. Alternatively, the "pencil" or "pen" may include one end that constitutes a writing portion, and another end that constitutes an "eraser" end which, when moved across the display, indicates that portions of the display are to be erased. Other types of input devices such as a mouse, trackball, or the like could be used. Additionally, a user's own finger could be used to select or indicate portions of the displayed image on a touch-sensitive or proximity-sensitive display. Consequently, the term "user input device" is intended to have a broad definition and encompasses many variations on well-known input devices. In alternate embodiments, inputs may be received using other devices, such as a mouse, track-ball, light pen, keyboard keys, etc.

Figure 4A:
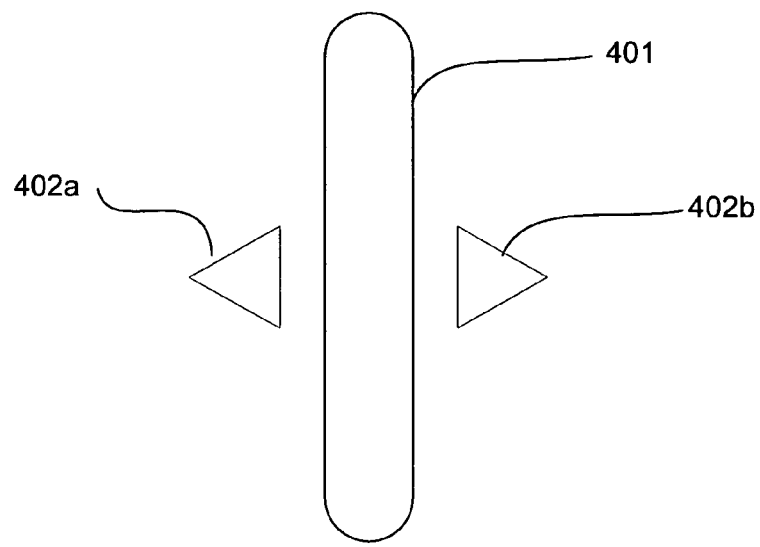
FIGS. 4A and 4B illustrate graphical user interface icons according to at least one embodiment of the present invention.

In one or more embodiments of the present invention, one or more graphical insertion point icons may be implemented to provide a more natural degree of feedback to the user of a computing device. FIG. 4A illustrates an insertion point icon 401 that may be placed in an electronic document upon receiving one or more inputs from a user. The inputs may be in any of a variety of forms, such as a keyboard entry using a cursor to indicate position, or one or more mouse clicks at a position. In an embodiment using a tablet and stylus, this input may be achieved using a stylus tap and/or touch on a tablet display screen at the desired position. The insertion point icon 401 may also include one or more directional indicators 402a, 402b, which may generally indicate an axis along which a directional flow of the text lies as indicated by indicator 402b. "Directional flow" of the text refers generally to the direction in which native readers of the language in which the text is written would linearly read the text, and may be viewed as a particular arrangement of the language "stream". For example, words (or characters, symbols, etc.) that are read first may be considered "upstream" of words that are read second. The reverse direction of text flow may also be indicated with indicator 402a.

Figure 5A:
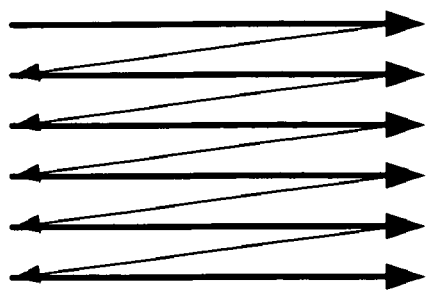
FIGS. 5A-C illustrate directional flows for various written forms of communication, or languages.
Figure 5B:
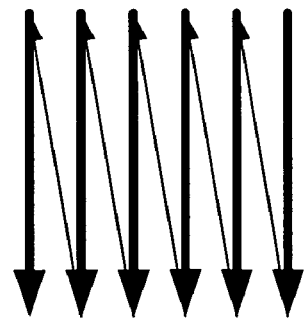
Figure 5C:
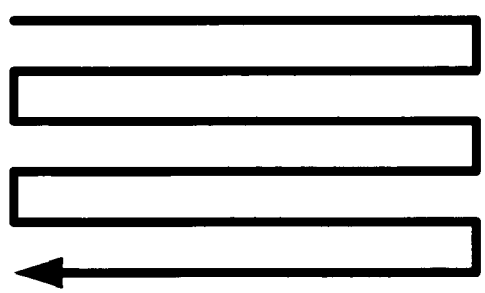

In order to fit this linear stream of words on a page, the stream is usually wrapped in some fashion, creating a directional flow. The manner of wrapping depends on the particular language, and several are depicted in FIGS. 5A-C. FIG. 5A shows the left-to-right, top-down flow of the English language. In the English language, words to the left of (or on lines above) a current position may be considered "upstream" from words to the right (or on lines below) a current position. As another example, the Chinese language arranges characters in the top to bottom, right to left, directional flow shown in FIG. 5B. In one or more embodiments of the present invention, the directional flow of text documents may be configured by, for example, a user selecting a particular language. By altering the directional flow, the manner in which spaces, text, and/or graphics are added or deleted is affected.

In one aspect of the present invention, the insertion point icon 401 is linear in shape. Such a shape may provide a clear identification of the position of the icon within the document.

In a further embodiment, a center line of the insertion point icon 401 is perpendicular to the directional flow of the line of text in which the insertion point is placed. A perpendicular icon may also provide a clearer identification of the icon's exact location.

In alternate embodiments, the center line of the insertion point icon 401 need not be linear, and need not be perpendicular. Such an icon may be desirable, for example, when placed among graphical images.

In one embodiment, once the insertion point icon 401 is placed within a document, the location of the insertion point icon 401 may be used for inserting and/or deleting material, such as text, graphics, space, etc. To implement an edit, the user may position the stylus over the insertion point icon 401, and enter an input, such as a button press on the stylus, or a tap on the display screen on the insertion point icon 401. Insertion point icon 401 may also be inserted and/or moved using other forms of user input, such as pressing one or more keys on a keyboard, using a mouse pointing device, etc. These additional forms of movement allow embodiments of the present invention to be implemented on a variety of computer systems. In further embodiments, the insertion point icon 401 may alter its appearance responsive to the proximity of the stylus or pointing device cursor, or if the insertion point icon is selected. For example, the insertion point 401 might change colors as the stylus gets near, indicating to the user that the stylus is near enough to the insertion point 401 to select it. The insertion point 401 may also appear depressed, like a button, upon selection. Altering the insertion point icon's appearance provides clearer feedback to the user when, for example, a pointing device cursor is positioned correctly over the icon 401.

Figure 4B:
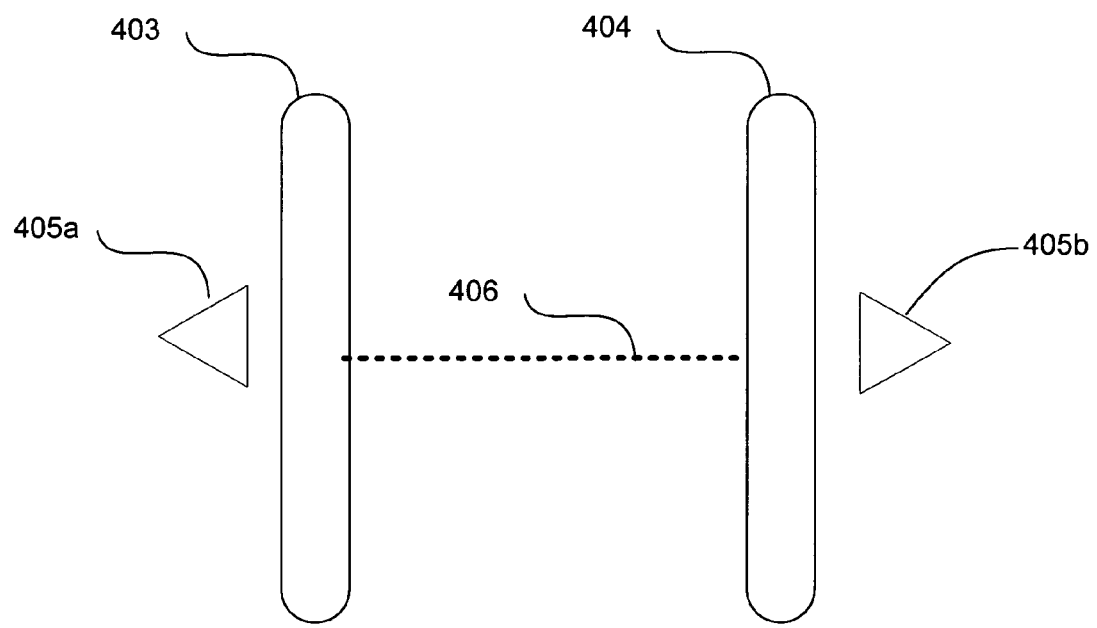

As discussed above, movement of the insertion point icon 401 may be initiated through a stylus tap or press on the tablet display over the insertion point icon 401 to select it for movement, but any other known method of selection may also be used. In various embodiments, selection of an insertion point causes the insertion point icon 401 to be split into two separate icons. FIG. 4B shows these icons as icons 403, 404. Each icon may also include an external directional indicator 405a, 405b. These directional indicators may indicate a direction, in line with the directional flow of the underlying text, that is external to the portion between the icons 403, 404, and may be located on the side of the icons 403, 404 that is external to the portion of the document between the icons. Such directional indicators help provide the user with feedback regarding the space to be inserted, and the text that is to be external to the inserted space. Alternatively, directional indicators may be placed on the sides of the icons 403, 404 that are internal to the portion of the document between the icons. Such "internal" directional indicators may provide the user with clearer feedback regarding the amount of space to be added or deleted. In other embodiments, one or more directional indicators may be omitted. Omitting these indicators may help conserve processing power for devices having fewer processing capabilities. In some embodiments, a dynamic connection line 406 may appear, visually connecting the icons 403 and 404. This connection provides additional feedback to the user regarding the space, text, and/or graphics that is to be added or deleted, and may dynamically expand or contract as the distance between the two icons 405a, 405b varies. Due to its movement and flexibility, this line may be referred to herein as a "bungee" line.

The splitting of the insertion point 401 is, in at least one embodiment, along a center line of the insertion point 401, but the two resulting icons 403, 404 may be of any size, and are not necessarily half the width of insertion point 401 (although they may be in some embodiments). After splitting, one of the icons (e.g., 403) is termed the "origin" icon (or cursor), and remains in the location of the original insertion point 401. The other one of icons (e.g., 404) becomes the "moving" icon, and may be moved through the user's input, such as dragging the stylus across the tablet display and, as a result, the electronic document. The determination as to which of icons 403, 404 is the "origin" and which is the "moving" may be arbitrary in some embodiments, and in others, may be determined based on predetermined factors. For example, one type of predetermined factor may relate to the position at which the user tapped on the insertion point 401 with the stylus. In such embodiments, a user who taps or presses on the left side of or above (in the English language, upstream) insertion point 401 may have icon 403 as the moving icon, and icon 404 as the origin icon, and the reverse may be true if the user tapped or pressed on the right side of or below insertion point 401. Alternatively, the designation of moving and origin icon may depend on the dragging motion of the user's stylus. In such embodiments, if a user dragged to the left of or above (e.g., upstream) insertion point 401, then icon 404 might be considered the origin icon, and icon 403 the moving icon. Similar designations may be made depending on whether the dragging motion was upwards or downwards from the insertion point 401, based on the directional flow of the underlying text. Alternatively, upon splitting, a single icon 403 (with or without directional indicator) may be placed at the position of the insertion point 401, and a second icon 404 (with or without directional indicator) may follow the user's input device (e.g., stylus) as it moves across the document.

Figure 6A:
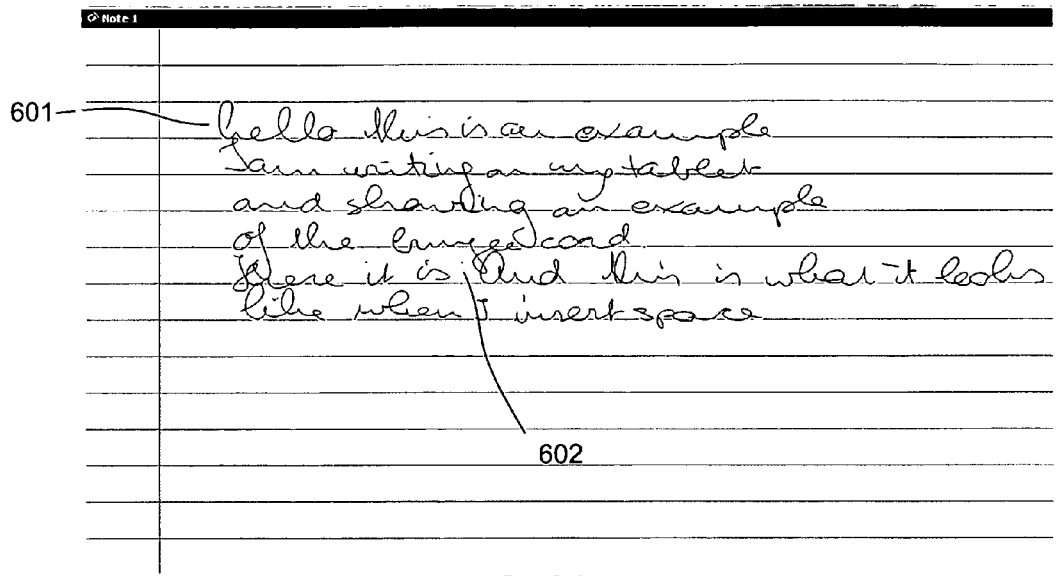
FIGS. 6A-E are screen shots using one or more aspects of the present invention.

FIGS. 6A-D depict various screens, and the associated process, that may appear in one embodiment when a user wishes to insert space in the middle of a portion of a document. The document may comprise text, handwritten text, graphics, and/or the like. In FIG. 6A, the user has handwritten several lines of text 601 in the English language. The handwritten text 601 may have been written on a tablet screen with a stylus pen.

Figure 6B:
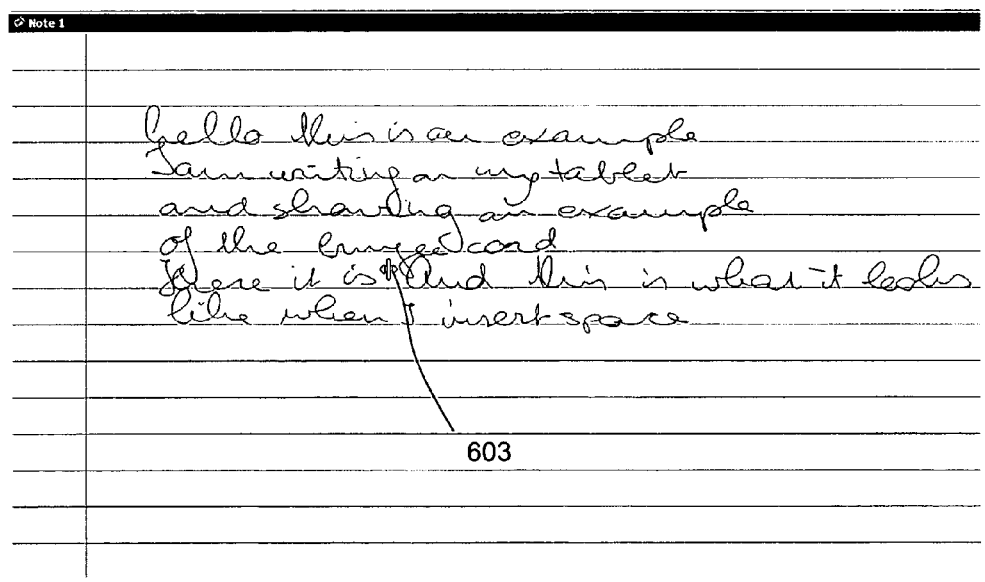

To indicate a location within the text 601 at which space is to be inserted, a user may use the stylus to identify a location 602 between two handwritten words displayed on a tablet screen. This identification may be accomplished using a stylus tap, stylus tap and press, or any other form of user input. In one embodiment, upon tapping or pressing, the insertion point 603 may appear as shown in FIG. 6B. Depending on the directional flow of the language of the underlying text, the text appearing after insertion point 603, or "post-insertion point text," may be required to move as a result of the insertion of space. In some embodiments, this movement of text may be referred to as a reflow of the text ink.

Figure 6C:
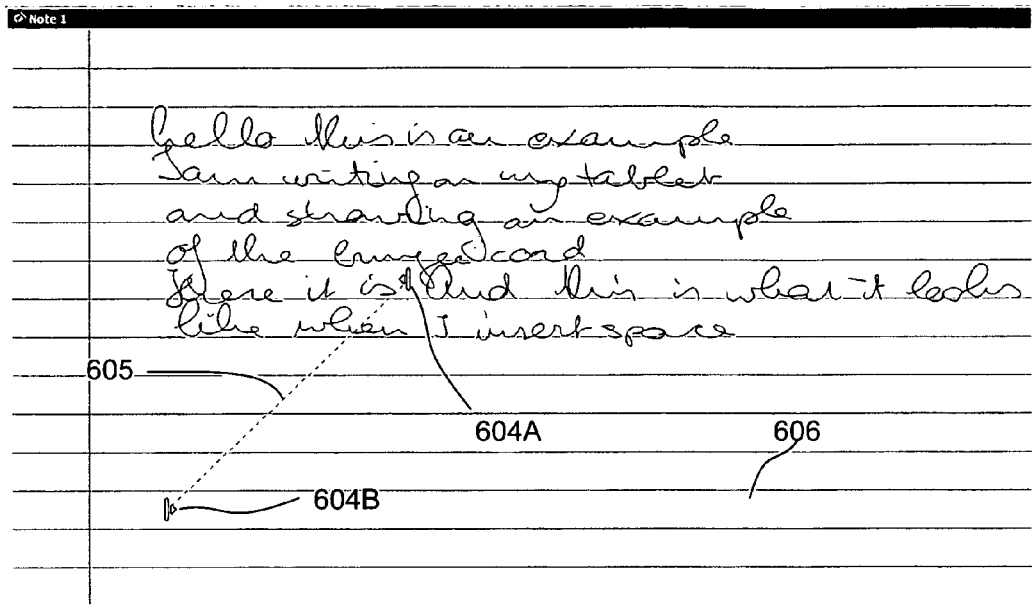
Figure 6D:
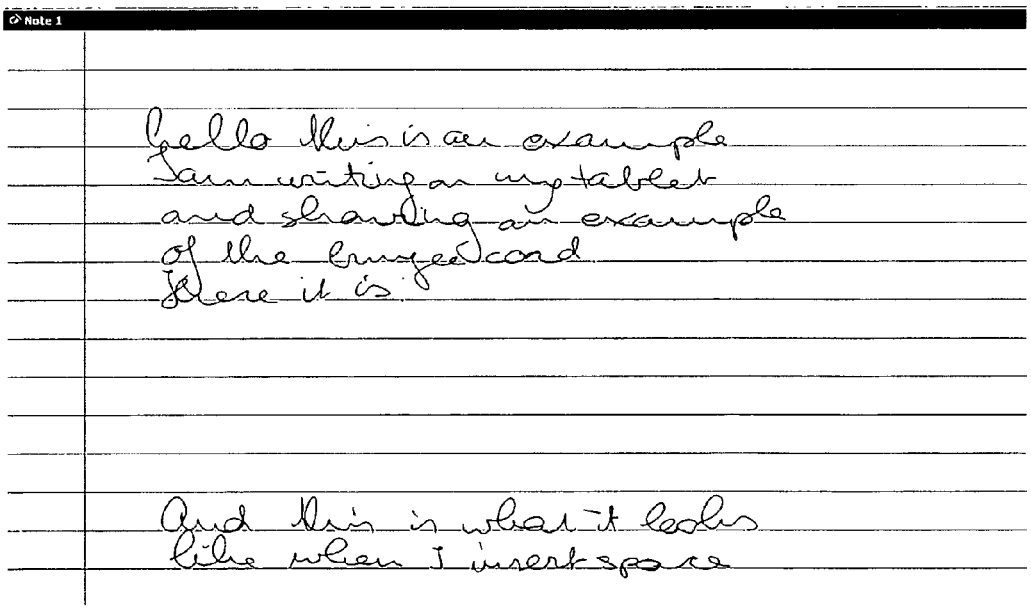

After the insertion point 603 appears, the user may then move (e.g., by tapping, dragging, pressing one or more keys, etc.) the insertion point 603 to identify the location to which the post-insertion point text is to be moved. For example, the user may select insertion point 603, and drag the moving cursor 604B to the location where the user wishes the text to continue as shown in FIG. 6C. As the user drags, the origin cursor 604A remains at the original location. Furthermore, the connection line, or bungee line 605, may also appear, connecting the two icons 604A, 604B and providing feedback to the user regarding where the post-insertion point text will appear. Moving the icon 604B may be finished, for example, upon lifting the stylus. When the icon 604B is moved, the text is moved accordingly, inserting additional space and resulting in the arrangement shown in FIG. 6D. The user may then insert and/or write additional text, graphics, etc. in the newly-created space.

Since the insertion point 603 may be placed within text and then moved, a determination may be made as to whether text upstream or downstream from the point is to be moved. For example, the space created in the example shown in FIGS. 6A-D is generated by moving the text that was originally downstream from point 603, further downstream. In alternative embodiments, the same space could have been generated by moving the text upstream from point 603 further upstream. In one embodiment, this determination may be made based on the direction of the movement of the moving cursor 604b. If the moving cursor 604b was moved downstream, then the text downstream from point 603 is moved further downstream. If the moving cursor 604b was moved upstream, the text upstream from point 603 would be moved further upstream. It will be understood that this determination may be made in other ways to generate the same space between the cursors 604a and 604b.

Figure 6E:
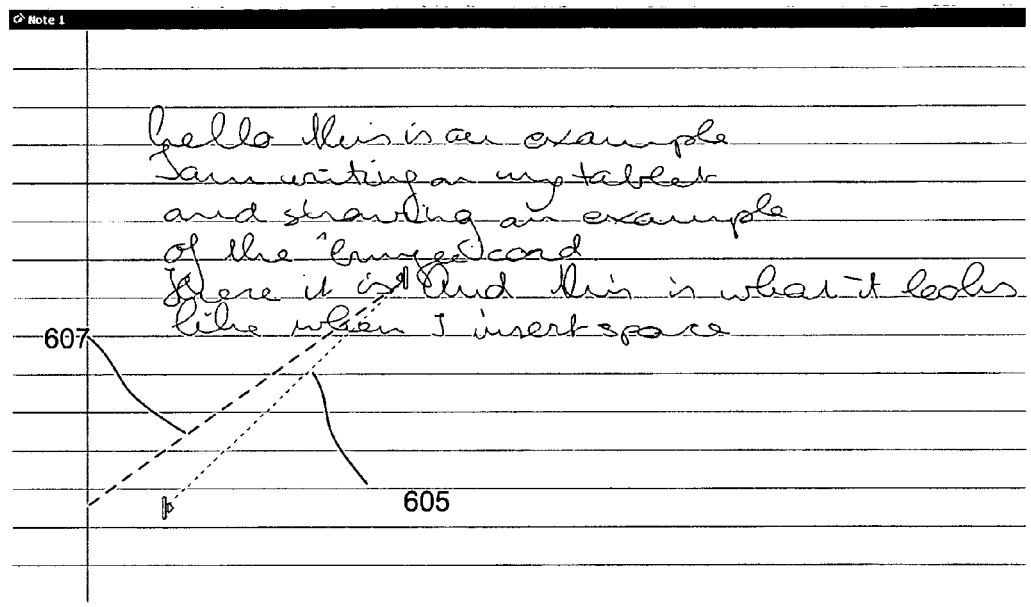

In alternative embodiments, as shown in FIG. 6E, the dynamic connector line 605 may be configured such that rather than connecting the origin icon 604a to the moving icon 604b, the bungee line may connect the origin icon 604a to a position along a margin of the electronic document to indicate the line to which the text beyond insertion point 603 will be moved. FIG. 6E depicts a margin dynamic connector 607. Showing the connection on the margin may avoid obscuring portions of the document being edited, and may simplify processing in some devices. In yet another alternative embodiment, multiple dynamic connection lines may appear, connecting the origin icon 604a with both the moving icon 604b and a location along a margin of the document indicating a particular line to which text will be moved. The screen shown in FIG. 6E contains both a dynamic connector 605 extending to the moving icon, and a margin dynamic connector 607 extending to a point along a margin. These multiple lines provide the user with a greater degree of visual feedback for the edit.

The post-insertion point text need not be moved to begin at the beginning of a line. For example, referring back to FIG. 6C, if the user had positioned the moving icon 604b at position 606, then the text beginning "And this is what it looks like" may simply be moved to begin at position 606. In this situation, the computing device may need to insert carriage returns and/or rearrange the moved text to properly move the appropriate text.

Furthermore, the moving icon 604*b* may also follow the user's dragging stylus to position 606, even if the underlying document contains no text or carriage returns up to position 606.

In alternate embodiments, the moving icon may be configured to follow the dragging stylus only as far as possible within the existing text (or carriage returns, tabs, spaces, etc.) in the document. In such alternate embodiments, if the user were to move the cursor beyond the end of the current document, the moving icon 604*b* may simply position itself at the current end of the document, with another cursor (and/or the bungee line) following the user's movement beyond the current end of the document. In this manner, the user may be given feedback as to how much new space is to be added to the existing document, and how much space already existed at the end of the document.

Figure 7A:
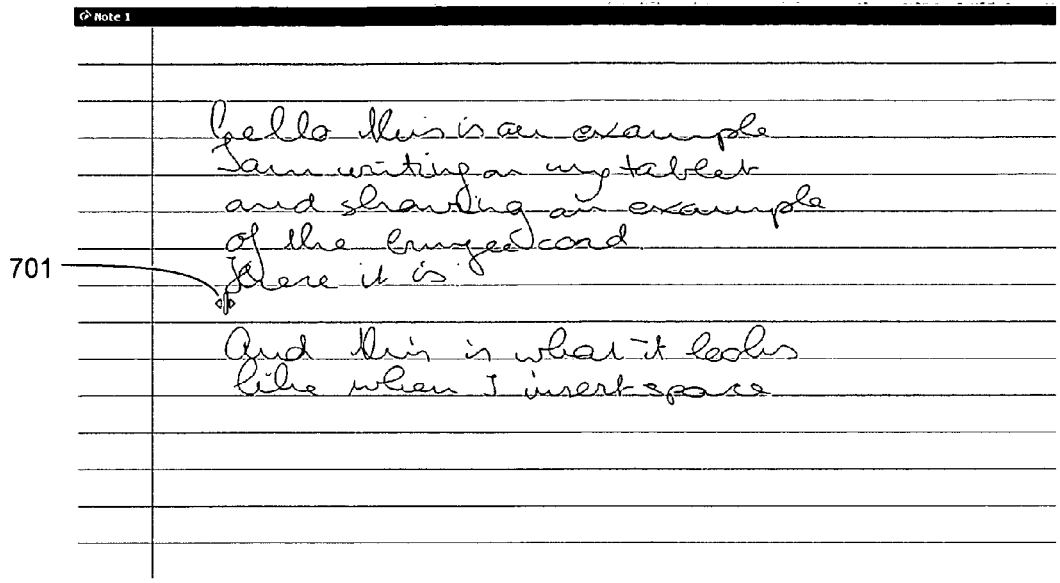
FIGS. 7A-C are screen shots using further aspects of the present invention.
Figure 7B:
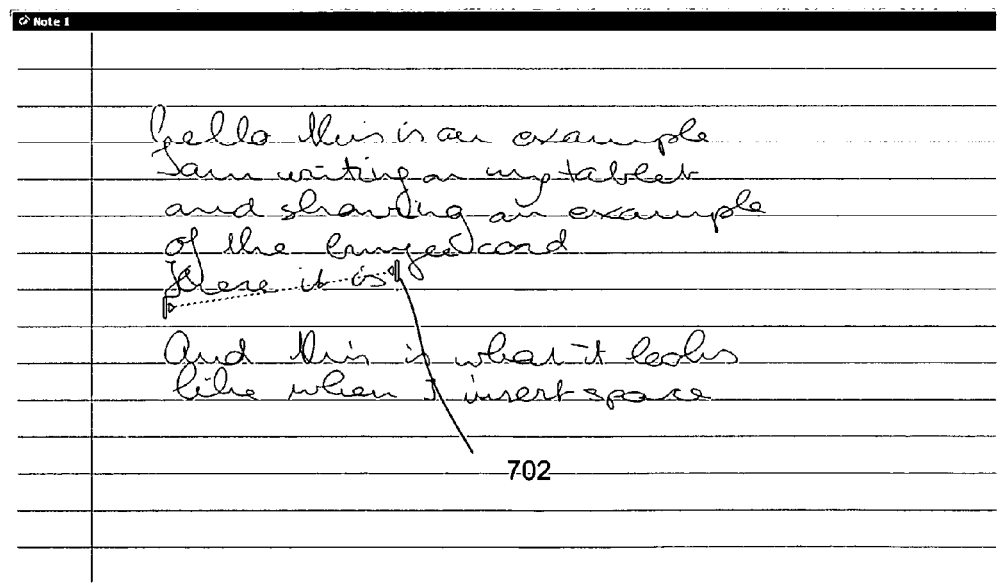
Figure 7C:
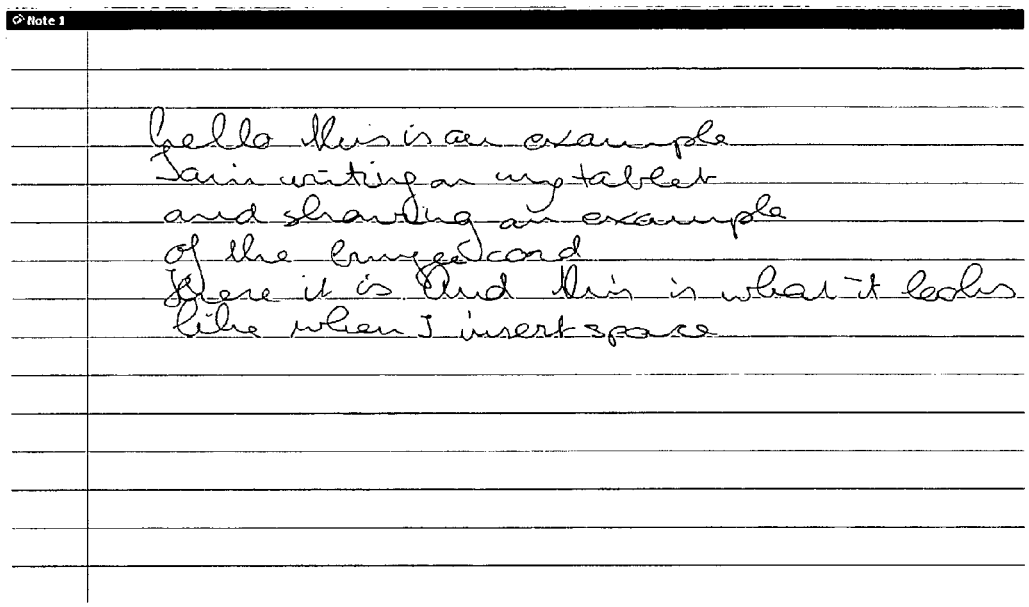

FIGS. 7A-C show screens depicting a user who is deleting space between groups of text, or "closing up" the text. In FIG. 7A, the user has inserted insertion point 701 at a position where space is to be deleted. Then, as shown in FIG. 7B, the user moves insertion point 701, splitting the insertion point 701 into an origin and a moving cursor as described above, up to the position 702 at which text is to be closed up. After this movement is complete, as shown in FIG. 7C, the text appearing downstream from point 701 is moved upstream to position 702, closing the space between the origin and moving cursor, and deleting the spaces (or tabs, carriage returns, control characters, etc.) therein. In some embodiments, the delete process may only delete a contiguous portion of text containing "invisible" characters (such as spaces, tabs, carriage returns, etc.), to delete only space in the document. In other embodiments, the delete space process may also delete "visible" characters, such as text. These other embodiments allow the user to close up space as well as unwanted portions of text, and offers greater flexibility to the user in the editing process.

In the delete process shown in FIGS. 7A-C, the moving icon is shown at position 702, a point beyond which no space remains to be deleted (e.g., the movement was upstream, and text appears further upstream from position 702). In various embodiments where only spaces are to be deleted, the moving icon remains at point 702 even if the user continues to drag the stylus above and/or to the left of (e.g., further upstream) point 702. In such embodiments, the moving icon ceases to move, and remains in position, once it is dragged to the maximum amount of contiguous space that may be deleted. Thus, the moving icon in a delete operation may simply refuse to move into text portions, helping to prevent inadvertent deletions in the "closing up" process, and providing the user with definite feedback as to where the deleted space resides. Similarly, the connection cord (or cords) may also be configured to cease movement. In alternative embodiments, the moving icon may jump to a position on a margin corresponding to point 702. Such an alternative may minimize the amount of data (e.g., text, graphics, etc.) that is obscured.

In further alternative embodiments, the aforementioned steps may be repeated to close up multiple areas of space using a single gesture of the user input device (e.g., stylus, pointer, etc.). For example, some embodiments may simply delete any spaces that exist between the stationary icon and the final position of the input device, leaving the non-space data (e.g., text, images, etc.). Such embodiments advantageously allow users to close up multiple areas of space using a single gesture.

In further embodiments, additional pairs of insertion point stationary/moving icons may be added for the additional areas of space that are to be closed. These additional pairs may also have the connectors and bungee lines described above. The additional pairs advantageously provide further visual feedback regarding the particular spaces to be closed.

As an example, the moving icon in FIG. 7B may refuse to move upwards and to the left of point 702 should the user continue to move, for example, a stylus or pointer in that direction. However, if the user should continue to move the stylus or pointer into another contiguous area of space (in FIG. 7B, such an area may exist above the paragraph that begins "hello this is an example . . . "), some alternate embodiments may allow the deletion of this second contiguous area of space as well by repeating some or all of the steps discussed above. In doing so, some embodiments may place another insertion point stationary/moving icon pair to correspond to the second area of space. The stationary icon of this added pair may be placed at one end of the second area of space (e.g., just prior to the word "hello" in the FIG. 7B example), while the second moving icon may follow the user's input device (e.g., stylus) as described above, closing up the additional area of space. This process may be repeated for any number of areas of space, and may simplify a user's ability to close up space in a document by closing multiple areas using a single gesture.

FIG. 7A also shows the insertion point 701 as being on the left-most side of a blank line. In choosing to delete space, the computing device may be configured to scan further downstream from the insertion point 701 until text is encountered (in this case, on the next line, with the word "And"), and include this space in the space to be deleted as well.

Such an embodiment assists users in deleting unwanted space. Alternatively, the computing device might close up only the space between the origin and moving cursor. Such an embodiment allows a user to reduce the amount of space without necessarily removing all space (e.g., if the user wishes to leave some amount of space untouched).

In the above embodiments, the computing device may determine whether an "insert" function or "delete" function is desired based on the direction in which the user moves the moving icon. If the moving icon is moved upstream (in English, to the left or up), a "closing up" process may be inferred; while if the moving icon is moved downstream (in English, to the right or down), an insert space process may be inferred. However, other embodiments may employ other methods for determining which of the two functions is desired. For example, the user may be queried (e.g., with a pop-up dialog box or window) as to whether a delete space or insert space operation is desired. As another example, the user might provide an input (such as pressing a particular key, or tapping a predetermined amount of times) indicating which process is desired. Such alternative embodiments may provide a more customizable experience for the user.

In further embodiments, the electronic document being edited may comprise handwritten text in electronic form. As shown in FIGS. 6 and 7, space may be added or deleted within handwritten text by using the various features described above.

In further embodiments, the insertion point may be used to insert text, graphics, or other data as a typical cursor. The insertion point may also be used to provide additional functional behavior, such as the display of a menu. Thus, for example, if a user taps a display once to place an insertion point, and then taps the insertion point or a directional indicator (e.g., rather than dragging or moving it), a menu may appear. The insertion point in this instance would not split.

The menu may offer the user selections regarding data, text, graphics, etc. to insert, and upon designation and/or entry of the material to be inserted, the material may simply be inserted, and the insertion point may be removed. As such, the insertion point may be configured to operate just as a standard cursor currently operates in any known word processing system.

Many of the embodiments discussed above relate to the editing of textual information. In further embodiments, the insertion point may be used to insert and/or delete space between text and images (or drawings), or between images, as well as within text.

Using one or more embodiments of the present invention, an intuitive interface may be achieved, yielding a more natural computer experience for the user. For example, the user may handwrite several lines of text onto a tablet-based computer simply by using the stylus as if it were a traditional ink pen. If the user should wish to insert additional handwritten words in the middle of a handwritten paragraph, the user may simply use the stylus to place the insertion point and drag a portion of the handwritten paragraph out of the way, making additional space. After handwriting the new words, the user may then "close up" the remaining space by once again placing the insertion point and dragging the remaining portion of the handwritten paragraph back up to the newly-added material. Editing a handwritten document is significantly more natural, while at the same time more user-friendly.

The discussion above provides various aspects and embodiments of the present invention, but the invention is not limited to the particular configurations disclosed. Rather, the disclosed embodiments are merely various embodiments. Those skilled in the relevant arts will readily appreciate the fact that many variations to the disclosed embodiments may be made without departing from the spirit and scope of the present invention. For example, one or more of the disclosed aspects or embodiments may be combined with one or more other aspects or embodiments.

We claim:

1. A computer-implemented method for editing electronic documents comprising:
    placing an insertion point icon at a first position in an electronic document responsive to a stylus or finger contacting a digitizer, the electronic document comprising text and having a directional flow;
    receiving a stylus or finger up event;
    detecting a stylus or finger proximate to the insertion point icon subsequent to receiving the stylus up event;
    responsive to detecting the stylus or finger proximate to the insertion point icon, providing feedback indicating that the insertion point icon is selectable;
    receiving a first stylus or finger input selecting the insertion point icon;
    transforming the insertion point icon into an origin icon and a moving icon based on receiving the first stylus or finger input;
    receiving a second stylus or finger input indicating movement from the first position to a second position on a second line, the second position being upstream of the first position in the directional flow of the document;
    responsive to the second stylus or finger input, displaying the origin icon at the first position, and displaying the moving icon at the second position;
    scanning downstream from the first position until a text or image portion of the electronic document is encountered, the area from the second position to the encountered text or image portion corresponding to a contiguous area of space;
    deleting the contiguous area of space responsive to the second stylus or finger input; and
    moving one or more portions of the electronic document responsive to the second stylus or finger input,
    wherein after said moving, one of the moved portions of the electronic document begins at the second position.

2. The computer-implemented method of claim 1, wherein providing feedback includes altering the appearance of the insertion point icon.

3. The computer-implemented method of claim 1, wherein transforming the insertion point icon further includes providing a bungee line that connects the origin icon and the moving icon.

4. The computer-implemented method of claim 1, wherein the stylus or finger input is capable of indicating movement in any direction in an x-y plane from the insertion point icon.

5. The computer-implemented method of claim 1, wherein the stylus or finger input is capable of indicating movement in at least five separate directions.

6. A computer-readable medium having computer-executable instructions for carrying out the method of claim 1.

7. The computer-implemented method of claim 1, wherein the following acts are performed prior to moving the one or more portions of the electronic document:
    prompting a user as to whether space should be inserted between the origin icon and the moving icon or space should be deleted between the origin icon and the moving icon; and
    receiving a user input indicating that space should be deleted between the origin icon and the moving icon.

8. The computer-implemented method of claim 7, wherein the space deleted between the origin icon and the moving icon includes content.

9. The computer-implemented method of claim 1, wherein the second position is located within a middle of the second line.

10. A computer-implemented method for editing electronic documents comprising:
    placing an insertion point icon at a first position on a first line of an electronic document;
    receiving a user input indicating movement from the first position to a second position located within a second line, the area between the first position and the second position corresponding to a selected area that includes at least one text portion and a plurality of contiguous areas of space;
    displaying a margin dynamic connector connecting the insertion point icon to a point on the margin corresponding to the second line associated with the second position;
    receiving a user input related to the selected area;
    deleting the plurality of contiguous areas of space without deleting the at least one text portion based on the received user input related to the selected area; and
    moving one or more portions of the electronic document from the first position to the second position.

11. The computer-implemented method of claim 10, wherein the following acts are performed prior to moving the one or more portions of the electronic document:
    prompting a user as to whether space should be inserted between the first position and the second position or space should be deleted from the first position to the second position; and receiving a user input indicating that space should be deleted from the first position to the second position.

12. The computer-implemented method of claim 10 further comprising, responsive to the user input, displaying an origin icon at the first position and displaying a moving icon at the second position.

13. The computer-implemented method of claim 10, wherein the second position is located within a middle of the second line.

14. The computer implemented method of claim 10, wherein the user input is received via a touch-sensitive or proximity-sensitive display.

15. The computer implemented method of claim 14, wherein the user input is received based on detection of a stylus or a finger.

16. A computer-readable medium having computer-executable instructions stored thereon for performing a method of editing documents on a computer system comprising:
- placing an insertion point icon at a first position on a first line of an electronic document;
- receiving a stylus input indicating movement from the first position to a second position located within a second line, the area between the first position and the second position including at least one text portion and a plurality of contiguous areas of space;
- displaying a first icon at the first position and displaying a second icon at the second position based on the received stylus input;
- displaying, based on the first position and the second position, at least one additional first icon and at least one additional second icon so that each contiguous area of space between the first position and the second position includes a first icon and a second icon; and
- deleting the plurality of contiguous areas of space without deleting the at least one text portion;
- wherein after said deleting, one of the moved portions of the electronic document begins at the second position.

17. The computer-readable medium having computer-executable instructions stored thereon of claim 16, wherein the second position is located within a middle of the second line.

18. A computer-implemented method for editing electronic documents comprising:
- placing an insertion point icon at a first position on a first line of an electronic document;
- receiving a user input indicating movement from the first position to a second position located within a second line, the area between the first position and the second position including at least one text portion and a plurality of contiguous areas of space;
- displaying a first icon at the first position and displaying a second icon at the second position based on the received user input;
- displaying, based on the first position and the second position, at least one additional first icon and at least one additional second icon so that each contiguous area of space between the first position and the second position includes a first icon and a second icon; and
- deleting the plurality of contiguous areas of space without deleting the at least one text portion;
- wherein after said deleting, one of the moved portions of the electronic document begins at the second position.

* * * * *